United States Patent Office 3,487,050
Patented Dec. 30, 1969

3,487,050
LOW TOXICITY POLYURETHANE COMPOSITION PRODUCED FROM LONG CHAIN ALIPHATIC DIISOCYANATES
Anthony J. Castro, Oak Park, and Layton F. Kinney, Villa Park, Ill., assignors to Armour Industrial Chemical Company, Chicago, Ill., a corporation of Delaware
No Drawing. Filed Feb. 20, 1968, Ser. No. 706,777
Int. Cl. C08g 22/18, 17/003, 51/36
U.S. Cl. 260—75
8 Claims

ABSTRACT OF THE DISCLOSURE

Polyurethane compositions prepared by the reaction of a hydroxyl containing polyester free of reactive unsaturation and an aliphatic diisocyanate having the formula

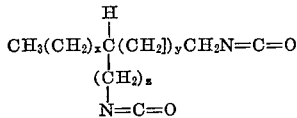

wherein $z$ is 0 to 2, $x$ and $y$ are integers from 0 to 19 and the sum of $x$ and $y$ is from 7 to 19. The polyurethanes produced provide hard, flexible, non-toxic coatings and castings.

BACKGROUND OF THE INVENTION

Resinous polyurethane materials have heretofore been provided by reacting diisocyanates, such as toluene diisocyanate, with non-reactive polyurethanes containing available hydroxyl groups. The properties of the resulting polyurethane resins depend to a large extent upon the organic compounds used as reactants. Polyurethanes obtained by using aromatic diisocyanates, such as toluene diisocyanate, are highly susceptible to sunlight degradation producing a yellowing of the polyurethane. Such discoloration renders coatings of such polyurethanes unsatisfactory when clear coatings are desired. Use of aliphatic diisocyanate, on the other hand, produces polyurethanes resisting degradation, but until this invention only polyurethanes from lower aliphatic diisocyanates, such as hexamethylene diisocyanate, have been produced. Hexamethylene diisocyanate produced polyurethane is not satisfactory due to the extremely high toxicity of hexamethylene diisocyanate. The residual diisocyanate present in the polyurethane renders the product commercially unacceptable due primarily to toxicity. Prior attempts to use other aliphatic diisocyanates, such as diisocyanate from dimer acid derived diamines, have not proved satisfactory to form coatings or castings, due to the extremely soft and rubbery nature of the cured polyurethane.

SUMMARY OF THE INVENTION

It is, therefore, an object of this invention to provide a relatively non-toxic polyurethane composition, cured polyurethane coatings and castings therefrom which are hard but relatively flexible, and a process for preparation of such polyurethane composition. It is another object of this invention to provide polyurethane resins which not only have excellent physical properties for coatings and castings, but also have improved resistance to degradation from ultra-violet radiation.

This invention provides a polyurethane resin by reacting non-reactive polyester and diisocyanate having the formula

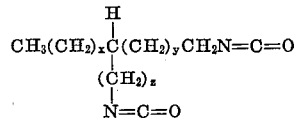

wherein $z$ is an integer from 0 to 2, $x$ and $y$ are integers from 0 to 19 and the sum of $x$ and $y$ is from 7 to 19. The polyurethane formed in this manner is especially satisfactory for the production of coatings and castings which are hard, flexible, resistant to sunlight degradation, and are non-toxic, even when they contain residual diisocyanates.

The polyester ingredient formed by esterification of polybasic acid and polyhydric alcohol preferably has a relatively high hydroxyl value, low acid value, and is soluble and liquid or fusible. The acid ingredient of the polyester is preferably dibasic and free of reactive unsaturation such as olefinic and acetylenic bonds. The acid may contain non-reactive unsaturation such as is present in the ring structure of acid, such as phthalic, terphthalic, isophthalic, and the like. Another suitable group of dicarboxylic acids includes acids in which the carboxyl groups are interconnected by hydrocarbon groups. Suitable acids include succinic, adipic, sebacic, azelaic acids, and others containing up to about 10 carbon atoms. The acid anhydrides may be used as initial ingredients, and mixtures of two or more acids and/or anhydrides may be utilized. It is especially preferred to use succinic or adipic acid and/or anhydride.

The polyhydric alcohol component of the polyesters may be dihydric, trihydric or higher. Dihydric alcohols including propylene glycol, dipropylene glycol, ethylene glycol, diethylene glycol and polyethylene glycol are suitable. Polyhydric alcohols containing at least three hydric functions suitable to form the polyesters for use in this invention include glycerol, pentaerythritol, trimethylolethane, trimethylolpropane, mannitol, and the like. Polyesters containing only dihydric alcohols as the alcohol component tend to be more flexible and thermoplastic than those containing trihydric or higher alcohols which form hard, thermoset resins. Mixtures of the two types of alcohols control the cross-linking in the polyurethane product. The ratio of dihydric to higher polyhydric alcohol may vary widely depending upon properties desired in the resulting polyurethane.

The polyester may be formed according to conventional well known methods of esterification by heating the mixture of acid and polyhydric alcohol to a temperature sufficiently high to effect evolution of water. The reaction is preferably continued at up to about 250 to 450° F. until the acid value is reduced to below 20, and preferably below about 12. Products of acid values of below 1 are obtainable. The ratios of hydroxyl functions to carboxyl functions are correspondingly high, for example, from about 50 up to 500 to 600. The water of reaction is usually stripped from the polyester to provide a substantially anhydrous product. Usually the residual water will not exceed from about 0.1 to 0.5%.

Diisocyanates suitable for use in our invention have the formula

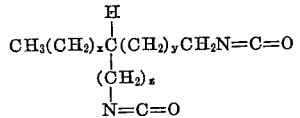

wherein z is an integer from 0 to 2, x and y are integers from 0 to about 19 and the sum of x and y is from about 7 to 19.

Typical compounds which fall within the above formula are diisocyanates derived from diamino compounds including aminolaurylamine, aminomyristylamine, aminopalmitylamine, aminostearylamine, aminoarachidylamine, aminobehenylamine, aminolignocerylamine, aminomethyllaurylamine, aminomethylmyristylamine, aminomethylpalmitylamine, aminoethylstearylamine, aminomethylarachidylamine, aminomethylbehenylamine, aminomethyllignocerylamine, aminoethyllaurylamine, aminoethylmyristylamine, aminoethylpalmitylamine, aminoethylstearylamine, aminoethylarachidylamine, aminoethylbehenylamine, aminoethyllignocarylamine, 9-aminodecylamine, 9-aminomethylundecylamine, 9-aminoethylundecylamine, and the like.

Especially preferred diisocyantes are derived from 9(10) - aminostearylamine, 9(10) - aminomethylstearylamine, 9-aminoundecylamine and 9-aminomethylundecylamine. Mixtures of two or more diisocyanates may be used.

Suitable diisocyanates may be prepared by reacting a carbonyl halide, such as phosgene with an amino *secondary*-alkyl amine. For example, by reacting phosgene with the hydrochloride salt of 9(10)-aminomethylstearylamine, at about 50 to 70° for 6 to 7 hours, more than 90 percent overall yield of aminomethylstearylamine diisocyanate may be obtained.

To obtain fully cured polyurethane (interpolymers of the polyester and diisocyanate) coatings and castings in a short period of time, it is preferred to incorporate into either the polyester component, or into the diisocyanate component, or into the mixture of polyester and diisocyanate, a suitable catalyst to promote the reaction. Suitable catalysts include N-methyl morpholine, tertiary amines such as trimethyl amine and triethyl amine, metal salts of organic acids such as zinc octanoate and dibutyl tin dilaurate, and diazabicyclo-alkene compounds selected from the group consisting of 1,5-diazabicyclo-[4.3.0]-nonene-5; alkyl-substituted 1,5-diazabicyclo-[4.3.0]-none-5; alkoxy-substituted 1,5-diazabicyclo-[4.3.0]-nonene-5; 1,5-diazabicyclo-[4.4.0]-decene-5; alkyl-substituted 1,5-diazabicyclo-[4.4.0]-decene-5; and alkoxy-substituted 1,5-diazabicyclo-[4.4.0]-decene-5. The diazabicyclo-alkene compounds may be prepared by methods described in Berichte, 99, page 2012 (1966) or by the cyclilation of aliphatic nitriles and pyrrolidone the diazabicyclo-alkene compounds suitable for use as catalysts in the invention have the formulas

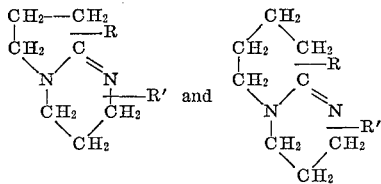

wherein R and R' are selected from the group consisting of alkyl and alkoxy groups containing from 1–4 carbon atoms. The method of producing polyurethanes using the diazabicycloalkene compounds is described in copending U.S. patent application Ser. No. 654,078, filed July 18, 1967.

The catalyst may be used in an amount from 0 to 10 weight percent, based upon the diisocyanate. Preferred amounts vary, depending upon the particular catalyst; from about 3 to 7 weight percent for zinc octanoate; from about 2 to 6 weight percent for tertiary amines; and from about 0.5 to 2 weight percent for diazabicyclo-alkenes.

The polyurethane of this invention can be cured without the addition of any catalyst by standing for approximately one week at room temperature, or by heating to about 80° to 150° C. for from 5 to 20 minutes.

The polyurethanes may be produced according to this invention by forming a mixture of the above described polyester and diisocyanate with blending until thoroughly mixed. It is preferred to use approximately stoichiometric amounts of polyester and diisocyanate. The stoichiometric proportions depend upon the number of hydroxy functions per carboxyl function of polyester. Suitable coatings and castings may be prepared using up to 10 percent excess of either the diisocyanate or polyester. In this regard, it is noted that one important advantage of the composition of this invention is that residual diisocyanate may be tolerated in that the aliphatic diisocyanate called for by this invention is relatively non-toxic. Thus, the polyurethanes formed may be substantially isocyanate or hydroxy terminated. In time, terminal isocyanate groups may convert to amines in the presence of moisture followed by reaction of the amine function with residual isocyanate.

Polyurethanes so formed may be used directly as a casting material, producing hard, flexible, non-toxic castings, the hardness of which may be controlled by choice of polyester.

For coating applications, it is frequently desirable to add a solvent to provide polyurethane of the most suitable viscosity. From about 10 to 50 weight percent, based upon the polyurethane composition, organic solvents which do not react with isocyanates, are suitable. Especially suitable are aromatic compounds such as toluene, xylene, Cellosolve acetate, and ketones such as methyl isobutyl ketone. Additionally, flow control agents may be added when desired to coating compositions. As especially suitable flow control agent is a 100 percent silicone resin having a viscosity at 20° C. of 5–30 centipoises 60% in xylol (SR–82, General Electric Company).

Coatings may be formed by casting films on the surface to be coated using the above described polyurethane composition, preferably with a solvent and flow control agent. An especially preferred coating may be prepared by using a polyester having an acid value of about 10 and formed from phthalic anhydride, adipic acid and glycerol in the ratio of from 1:5:8 respectively. The polyester is blended with a stoichiometric amount of aminostearylamine diisocyanate and blended until mixed. About 1 weight percent, based upon the diisocyanate, 1,5-diazabicyclo-[4.3.0]-nonene-5, and about 25 weight percent, based upon the total polyurethane composition, of xylene is added with mixing. The resulting composition is cast into a film on tin plate and is cured by heating to about 140° F. for about 15 minutes. A hard, flexible, clear, non-toxic coating is formed.

A surprising and commercially important property of the polyurethane coatings produced by the compositions of this invention is their very low toxicity. The toxicity of polyurethane compositions results from toxicity of the diisocyanate component. The diisocyanates called for by this invention exhibit very low toxicity. Hexamethylene diisocyanate, using Sprague Dawley rats has been found to have a single oral dose $LD_{50}$ of 1.05 grams/kilogram. The recommended permissible vapor concentration of hexamethylene diisocyanate is 0.02 p.p.m. in air. Tests conducted using diisocyanates derived from aminomethylstearylamine showed the $LD_{50}$ of the single oral dose to Sprague Dawley rats to be 21.8 grams/kilogram. Rats subjected to inhalation of diisocyanates derived from aminomethylstearylamine for a 7½ hour exposure at a vapor concentration essentially saturated showed no signs of toxicity. Further, when introduced into rabbit eyes diisocyanates derived from aminomethylstearylamine was found to be non-irritating. When applied in 0.5 ml. quantities to intact and abraded skin of the rabbits, diisocyanates derived from aminomethylstearylamine produced only a minimal degree of transient irritation. The diisocyanates derived from aminomethylstearylamine would, therefore, appear to present no hazard to health under ordinary conditions of industrial use.

The following examples are presented to illustrate the present invention.

Example I

A polyester pre-polymer was prepared from 20 grams of succinic anhydride and 40 grams of trimethylol propane cooked to an acid value of 6 and hydroxyl value of about 478. 4.15 grams of the above described polyester were mixed with 7.5 grams of aminomethylstearylamine diisocyanate, 0.5 gram of zinc octoate, and 10.75 grams of xylene were added with mixing. Using this composition, a film was cast on tin plate and allowed to cure at room temperature. The film was tack-free overnight and exhibited a Sward hardness of 52 after 3 days. The film was clear, hard and flexible.

Example II

Following the procedure of Example I, 8.3 grams of polyester, as prepared in Example I, were mixed with 5.0 grams aminomethylstearylamine diisocyanate and 6.7 grams of xylene, and 0.5 gram of zinc octoate were added with mixing. A film was cast in the same manner as described in Example I and cured at room temperature. A very satisfactory film resulted. The film exhibited a Sward hardness of 60 after 3 days.

Example III

A polyurethane composition suitable for castings was prepared by mixing 4.25 grams of polyester, as prepared in Example I, with 8 grams of aminomethylstearylamine diisocyanate and 0.5 gram of zinc octoate and blended until uniform. The composition was poured into a mold, and a hard, flexible casting was produced upon curing at room temperature.

Example IV

A polyester pre-polymer is prepared using phthalic and adipic acid and glycerol with mole ratio of 1:5:8 respectively and cooked to an acid value of about 10. 4.2 grams of this polyester are mixed with 7.5 grams of aminomethylstearylamine diisocyanate, 11 grams of 50 percent xylene and 50 percent methylisobutyl ketone and 0.5 gram of zinc octoate. The composition is cast into a film on tin plate and cured by heating to about 130° C. for about 15 minutes. The film produced is clear, hard and flexible.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. Polyurethane prepared by a process comprising reacting hydroxyl containing polyester free of reactive unsaturation with diisocyanate having the formula

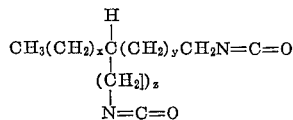

wherein $z$ is an integer from 0 to 2, $x$ is an integer from 0 to 8, $y$ is an integer from 8 to 19, provided that the sum of $x$ and $y$ is from 8 to 19.

2. The polyurethane of claim 1 wherein said diisocyanate is selected from those derived from diamino compounds of the group consisting of 9(10)-aminostearylamine, 9(10)-aminomethylstearylamine, 9-aminoundecylamine and 9-aminomethylundecylamine.

3. The polyurethane of claim 1 wherein said polyester has an acid value below 20.

4. The polyurethane of claim 1 wherein said polyester has an acid value below 12 and is produced by the esterification of a dibasic carboxylic acid and polyol selected from the group consisting of dihydric and trihydric alcohols.

5. The polyurethane of claim 4 wherein said carboxylic acid is selected from the group consisting of phthalic, terephthalic, isophthalic, succinic and adipic acids and said polyol is selected from the group consisting of propylene glycol, ethylene glycol, glycerol, pentaerthritol and trimethylolpropane.

6. Cured polyurethane prepared by the process comprising curing polyurethane prepared by a process comprising reacting hydroxyl containing polyester free from reactive unsaturation with diisocyanate having the formula

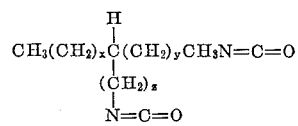

wherein $z$ is an integer from 0 to 2, $x$ is an integer from 0 to 8, $y$ is an integer from 8 to 19, provided that the sum of $x$ and $y$ is from 8 to 19.

7. Cured polyurethane of claim 6 wherein said curing is achieved by heating to about 80° to 150° C. for from about 5 to 20 minutes.

8. Cured polyurethane of claim 6 wherein said curring is achieved in the presence of from about 0.5 to 2 weight percent of diazabicyclo-alkene catalyst selected from the group consisting of 1,5-diazabicyclo-[4.3.0]-nonene-5; alkyl - substituted 1,5 - diazabicyclo - [4.3.0] - nonene-5; alkoxy-substituted 1,5-diazabicyclo-[4.3.0]-nonene 5; 1,5-diazabicyclo - [4.4.0] - decene - 5; alkyl - substituted 1,5-diazabicyclo-[4.4.0] - decene - 5; and alkoxy-substituted 1,5-diazabicyclo-[4.4.0]-decene-5.

References Cited

UNITED STATES PATENTS

| | | | |
|---|---|---|---|
| 2,650,212 | 8/1953 | Windemuth | 260—75 |
| 2,753,319 | 8/1956 | Brockway | 260—30.6 |
| 2,993,047 | 8/1961 | Bortnick et al. | 261—251 |
| 3,084,177 | 4/1963 | Hostettler et al. | 260—404.5 |
| 3,356,650 | 12/1967 | McElroy | 260—77.5 |

DONALD E. CZAJA, Primary Examiner

H. S. COCKERAM, Assistant Examiner

U.S. Cl. X.R.

260—77.5, 31.6, 32.8, 33.6